United States Patent Office 3,705,870
Patented Dec. 12, 1972

3,705,870
SOLUBLE POLYIMIDES FROM AROMATIC DI-
ANHYDRIDES AND 2,4-DIAMINODIPHENYL-
AMINES AND 2,4-DIAMINODIPHENYL SUL-
FIDES
Franklin P. Darmory and Marianne Di Benedetto,
Ardsley, N.Y., assignors to Ciba-Geigy Corporation,
Greenburgh, N.Y.
No Drawing. Filed Dec. 27, 1971, Ser. No. 212,679
Int. Cl. C08g 51/26, 51/44
U.S. Cl. 260—30.2 R       29 Claims

ABSTRACT OF THE DISCLOSURE

Polyimides are prepared by reacting an aromatic tetracarboxylic acid dianhydride with a diamine having the formula

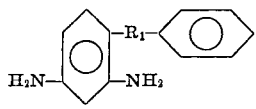

wherein $R_1$ is S, N—H, N-lower alkyl, N-aryl. These polyimides are soluble in certain organic solvents whereby they can be fabricated into films, coatings, laminates and the like. The polyimides are also fusible and moldings thus obtained are low in void content.

DETAILED DISCLOSURE

This invention relates to novel soluble aromatic polyimides which are characterized by a recurring unit having the following structural formula

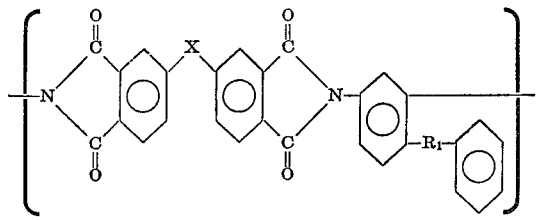

wherein $R_1$ is S, NH, N-(lower)alkyl or N-aryl; and X is —O—, —S—, —CO—

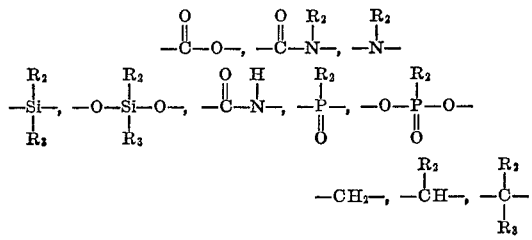

and phenylene, where $R_2$ and $R_3$ are (lower)alkyl of from 1 to 6 carbon atoms and aryl, and the polyamide acids from which they are derived. The (lower)alkyl group employed herein include both straight and branched chain alkyl groups having up to six carbon atoms. Examples of such groups are methyl, ethyl, propyl, isopropyl, butyl, pentyl, hexyl and the like.

The aryl groups representative of $R_1$, include phenyl; phenyl substituted with one or more alkyl groups such as methyl, ethyl, propyl, or with one or more halogen groups such as chlorine or bromine or with one or more nitro groups, and preferably phenyl.

The aryl groups representative of $R_2$ and $R_3$ include those as defined for $R_1$ and further include naphthyl, anthryl, phenanthryl, and preferably phenyl.

The polyimides produced according to this invention are characterized by useful solubility in certain organic solvents. Polyimides heretofore known to the art have generally been extremely insoluble, and have not been shapeable after conversion from the polyamide-acid state to the polyimide form. The polyimides of the invention are extremely useful in that they can be dissolved in certain solvents, in relatively high concentration, and the solutions can be employed for further fabrication of the polyimides. In this way, it is possible to produce polyimide films, coatings and the like without the necessity of using a polyamide-acid intermediate with a follow-on conversion step. This is highly advantageous, because it permits the application of polyimide coatings to articles which might be damaged by heating or chemical conversion techniques heretofore necessary.

The soluble polyimides display excellent physical, chemical and electrical properties which render them capable of being used as adhesives, laminating resins for printed circuit boards, fibers, coatings for decorative and electrical purposes, films, wire enamels and molding compounds.

These polyimides have been found to be soluble to the extent of at least 20% by weight at a temperature of about 25° C. in common polyamide type solvents such as N-methylpyrrolidone, dimethylacetamide, hexamethylphosphoramide, dimethylsulfoxide, dimethylformamide and the like, as well as solvents such as cyclic ethers as represented by dioxane and tetrahydrofuran; chlorinated hydrocarbons such as methylene chloride, trichloromethane, tetrachloroethane, 1,1,2 - trichloroethane and the like; phenolic type solvents such as cresol, phenol, chlorinated phenol and the like; and solvents such as nitrobenzene and pyridine.

The polyimides are prepared by reacting an aromatic tetracarboxylic acid dianhydride of the formula

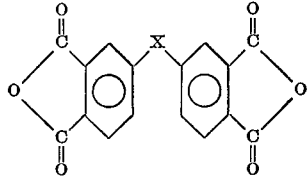

wherein X is as defined previously, with a diamine having the formula

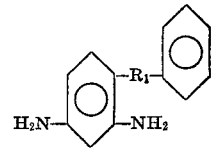

wherein $R_1$ is as defined above; in an organic reaction medium which is a solvent for at least one of the reactants, preferably under substantially anhydrous conditions, at a temperature below 100° C. and preferably at 20° C. to 50° C. The product of this reaction is a polyamide-acid represented by the following formula

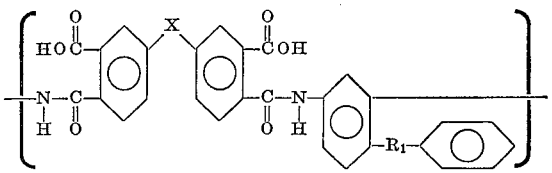

wherein $R_1$ and X is as defined above.

The polyamide acid is subsequently converted to the polyimide by several methods which include heating the polyamide acid solution at temperatures between 100° C. and 240° C. depending on the boiling point of the organic solvent, until imidization is complete; by chemical means, e.g., by adding to the polyamide acid solution a dehydrating agent such as acetic anhydride alone or in combination with a tertiary amine catalyst such as pyridine and optionally heating or not heating the resulting solution at about 120° C. until imidization is complete.

More specifically, the preparation of the polyamide acid which is subsequently converted to the polyimide can be conveniently carried out in a number of ways. The diamines and dianhydrides can be premixed as dry solids in equivalent amounts and the resulting mixture can be added, in small portions and with agitation, to an organic solvent. Alternately, this order of addition can be reversed i.e. after premixing the diamine and the dianhydride, the solvent may be added to the mixture with agitation. It is also possible to dissolve the diamine in the solvent while agitating and to add slowly the dianhydride in portions that provide a controllable rate of reaction. However, this order of addition can also be varied. Still another process involves dissolving the diamine in one portion of a solvent and the dianhydride in another portion of the same or another solvent and then mixing the two solutions.

The degree of polymerization of the polyamide acid and its corresponding polyimide is subject to deliberate control. The mole ratio of diamine to dianhydride in the initial reaction mixture may range from 2:1 to 1:2. The use of equimolar amounts of the reactants under the prescribed conditions provides polymers of very high molecular weight while the use of either reactant in large excess limits the extent of the polymerization. However, the scope of this invention includes both high and low molecular weight polyamide acids and their corresponding polyimides.

The low molecular weight polymers can further be utilized as intermediate prepolymers which can be reacted with the appropriate chain extending agents to yield polymers which are useful as adhesives, and as molding and laminating resins. The low molecular weight polymers may be end capped with reactive functional group compounds such as nadic anhydride, maleic anhydride, methylnadic anhydride and the like, and subsequently heated to induce cross-linking and chain extension.

Besides using an excess of one reactant to limit the molecular weight of the polymers, a chain terminating agent such as phthalic anhydride or aniline may be used to cap the ends of the polymer chains.

To effect the conversion of the polyamide acids to the polyimides, the polyamide acids are heated above 50° C. and preferably in an inert atmosphere and more preferably in an inert atmosphere between 110° C. and 240° C. In the preferred process, the polyamide acids are prepared at a temperature below 50° C. and maintained at this temperature until maximum viscosity denoting maximum polymerization is obtained. The polyamide acid in solution and under an inert atmosphere is subsequently heated to about 110° C. to 240° C. to convert the polyamide acid to the polyimide. The soluble polyimide may be alternatively prepared by mixing the diamine and the dianhydride at room temperature in a solvent such as nitrobenzene and then rapidly heating the mixture to reflux for about 2 to 12 hours.

The starting aromatic diamines may be prepared by the following route

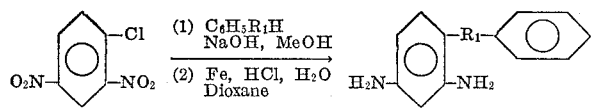

wherein $R_1$ is as previously defined.

The first step may be run at reflux temperatures for a period of from 1 to 24 hours. The second step wherein the nitro groups are reduced to amino groups is conducted at reflux temperatures from 2 to 48 hours.

The soluble polyimides can be precipitated from their solutions by use of methanol, water, acetone, spray drying and the like. The resulting granular material can be molded or redissolved in a suitable solvent to yield a film-forming or varnish type composition. Other appropriate ingredients can be added to the polyimide solutions or molding powders including fillers, dyes, pigments, thermal stabilizers and the like, depending on the end use.

It has also been found that these polyimides when heated above 225° C. in the atmosphere will cross-link without the elimination of volatiles, yielding a polyimide which is essentially insoluble. Thus, these polyimides have the added advantage of being soluble and fusible during the fabrication stages and can be made insoluble if desired by appropriately heating the completely fabricated product under atmospheric conditions at temperatures of greater than 225° C. This cross-linking is believed to result from oxidation reactions, although the exact nature of the cross-linking is not definitely known.

Thus, these polyimides are especially well suited for film, wire enamel and laminating applications wherein the polyimides can be coated onto the substrate from cold or hot solutions at a solid concentration of from 25% to 50% by weight solids and cross-linked to yield coatings which are impervious to the solvents in which they were once soluble.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the polymeric solution. That is, the solution should contain 0.05–40% of the polyimide component. The viscous solution of the polymeric composition containing 10% to 40% polyimide in the polymeric component dissolved in the solvent may be used as such for forming shaped structures.

To further illustrate the nature of this invention and the process employed in preparing the soluble polyimides, the following examples are given below:

EXAMPLE I 2,4-diaminodiphenylsulfide

A methanolic solution of sodium thiophenoxide (prepared from 12.1 g. (0.11 mole) of thiophenol and 40 ml. of methanolic 10% sodium hydroxide) was added dropwise to a solution of 11.1 g. (0.11 mole) of 1-chloro-2,4-dinitrobenzene in 200 ml. of methanol. The mixture was refluxed for 30 minutes, diluted with water, and filtered. The collected solid was washed with water and air dried, M.P. 105–114° C.

The intermediate dinitro compound was taken up in 1500 ml. of dioxane and treated with 112 g. (2 moles) of iron powder. This mixture was brought to reflux and treated dropwise with 10 ml. of concentrated hydrochloric acid and 140 ml. of water. The mixture was refluxed for 10 hours, cooled, filtered, concentrated in vacuo, and diluted with water. The product was recrystallized from ethanol and had an M.P. of 90–93° C.

Calcd. for $C_{12}H_{12}N_2S$ (percent): C, 66.63; H, 5.59; N, 12.95; S, 14.82. Found (percent): C, 66.86; H, 5.69; N, 13.00; S, 14.88.

EXAMPLE II 2,4-diaminodiphenylamine

To 40 ml. of methanolic sodium hydroxide (10% by weight) is added 0.11 mole of aniline. This solution is added dropwise to a solution of 11.1 g. (0.11 mole) of 1-chloro-2,4-dinitrobenzene in 200 ml. of methanol. The mixture is refluxed for 30 minutes, diluted with water, and filtered. The collected solid is washed with water and air dried.

The intermediate dinitro compound is taken up in 1500 ml. of dioxane and treated with 112 g. (2 moles) of iron powder. This mixture is brought to reflux and treated dropwise with 10 ml. of concentrated hydrochloric acid and 140 ml. of water. The mixture is refluxed for 10 hours, cooled, filtered, concentrated in vacuo, and diluted with water. The product is recrystallized from ethanol.

In a similar manner, by substituting for aniline an equivalent amount of the following amines:

(a) N-methylaniline
(b) N-phenylaniline
(c) N-ethylaniline
(d) N-hexylaniline

There is respectively obtained the following diamines:

(a) 2,4-diaminodiphenylmethylamine
(b) 2,4-diaminotriphenylamine
(c) 2,4-diaminodiphenylethylamine
(d) 2,4-diaminodiphenylhexylamine

EXAMPLE III

To a solution of 0.01 mole of 2,4-diaminodiphenylamine in 45 ml. of distilled N-methyl pyrrolidone, under nitrogen, was added 3.222 g. (0.1 mole) of 3,4,3',4'-tetracarboxylic benzophenone dianhydride (BTDA) in portions over a 15 minute period. The solution was then stirred for about 15 hours at room temperature and under nitrogen.

The reaction vessel was then immersed in a 200° C. oil bath. Thermal equilibrium was rapidly established at 185° C. and the reaction mixture was maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

The soluble polyimide thus obtained had an intrinsic viscosity of 0.61 in N-methylpyrrolidone at 30° C. and a glass transition temperature of 338° C. as determined by torsional braid analysis.

Films were cast from the polyimide solution onto glass and aluminum and heated in a forced air oven at 200° C. for 1 hour to drive off the solvent. The coatings obtained were clear, tough, and flexible and all the coatings were able to be dissolved in the solvent from which they were prepared.

When the same coatings were heated to 300° C. for one half hour, they were still tough, clear and flexible; however, they were no longer soluble.

The polyimide was aged isothermally in a forced air oven at 300° C. The percent weight loss was minor after 600 hours.

The polyimide powder which was obtained by precipitation from solution with acetone and dried in a vacuum oven at 80° C. was soluble as a 20% solids solution in dimethylacetamide, chloroform and dioxane respectively.

EXAMPLE IV

To a solution of 0.01 mole of 2,4-diaminodiphenylsulfide in 45 ml. of distilled N-methyl pyrrolidone, under nitrogen, was added 3.222 g. (0.01 mole) of BTDA in portions over a 15 minute period. The solution was then stirred for about 15 hours at room temperature and under nitrogen.

The reaction vessel was then immersed in a 200° C. oil bath. Thermal equilibrium was rapidly established at 185° C., and the reaction mixture was maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

The soluble polyimide thus obtained had an intrinsic viscosity of 0.11 in N-methyl pyrrolidone at 30° C., and a glass transition temperature of 276° C. as determined by torsional braid analysis.

The polyimide may be obtained in powder form by precipitating the polyimide from solution using acetone and drying the powder under vacuum at 80° C.

The powder may be molded by heating the powder in a cavity mold at 300° C. and a pressure of about 5000 p.s.i.

EXAMPLE V

To a solution of 0.01 mole of 2,4-diaminodiphenylmethylamine in 45 ml. of distilled N-methyl pyrrolidone, under nitrogen, is added 3.222 g. (0.01 mole) of BTDA in portions over a 15 minute period.. The solution is then stirred for about 15 hours at room temperature and under nitrogen.

The reaction vessel is then immersed in a 200° C. oil bath. Thermal equilibrium is rapidly established at 185° C., and the reaction mixture is maintained at that temperature for 3 hours. The reaction vessel is swept out by a strong nitrogen flow during the first few minutes of the imidization so as to remove all traces of water formed in the reaction. The vessel is again swept out after 10 minutes, 30 minutes and 1 hour.

Laminates may be prepared from this soluble polyimide for use as printed circuit boards by coating 7628 fiber glass cloth with the resin solution. Dry the coated fiber glass in a vacuum oven at 80° C. for 2 hours. Cut the prepeg into squares and lay up in a press preheated to 150° C. to form a 13 ply laminate and hold for 15 minutes. Apply 500–1000 p.s.i. to the laminate, then slowly raise the temperature to 215° C. Hold this temperature and pressure for 2 hours, then increase over a 1 hour period to 275° C. Hold at 275° C. for 1 hour, then heat to 360° C. and hold for 15 minutes. Cool under pressure to 160° C.

EXAMPLE VI

To a solution of 0.01 mole of 2,4-diaminotriphenylamine in 45 ml. of distilled N-methyl pyrrolidone, under nitrogen, was added 3.222 g. (0.01 mole) of BTDA in portions over a 15 minut period. The solution was then stirred for about 15 hours at room temperature and under nitrogen.

The reaction vessel was then immersed in a 200° C. oil bath. Thermal equilibrium was rapidly established at 185° C., and the reaction mixture is maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

A soluble polyimide was obtained which may be further converted to a molding powder by coagulation from acetone with high speed stirring.

EXAMPLE VII

To a solution of 0.01 mole of 2,4-diaminodiphenylamine in 45 ml. of distilled N-methyl pyrrolidone, under nitrogen was added 3.222 g. (0.01 mole) of BTDA in portions over 15 minute periods. The solution was then stirred for about 15 hours at room temperature and under nitrogen. To this solution was added 10 ml. of acetic anhydride and 2.5 ml. of pyridine. The solution was then heated at 120° C. for 3 hours to yield the soluble polyimide.

EXAMPLE VIII

A solid mixture of 0.01 mole of 2,4-diaminodiphenylsulfide and 3.222 g. (0.01 mole) of BTDA in 100 ml. of nitrobenzene was brought to reflux under nitrogen in one hour. The solution was maintained at reflux for 12 hours to yield a soluble polyimide. The polyimide solution may be applied directly as a coating or a wire enamel useful, for example, as electrical wire insulation; or, the polyimide may be isolated by coagulation from acetone and used as a molding powder.

EXAMPLE IX

By essentially following the procedure of Example III, soluble polyimides may be obtained by reacting equivalent amounts of the following aromatic dianhydride and diamine derivatives:

(a) bis(3,4-dicarboxyphenyl)ether dianhydride plus 2,4-diaminodiphenylamine
(b) bis(3,4-dicarboxyphenyl)sulfone dianhydride plus 2,4-diaminodiphenylsulfide
(c) bis(3,4-dicarboxyphenyl)sulfone dianhydride plus 2,4-diaminotriphenylamine
(d) bis(3,4-dicarboxyphenyl)methane dianhydride plus 2,4-diaminodiphenylmethylamine
(e) 1,1-bis(3,4-dicarboxyphenyl)ethane dianhydride plus 2,4-diaminodiphenylethylamine
(f) 3,4,3',4'-tetracarboxylic phenylbenzoate dianhydride plus 2,4-diaminodiphenylamine
(g) 3,4,3',4'-tetracarboxylic triphenylamine dianhydride plus 2,4-diaminodiphenylsulfide
(h) 3,4,3',4'-tetracarboxylic tetraphenylsilane dianhydride plus 2,4-diaminodiphenylmethylamine
(i) 3,4,3',4'-tetracarboxylic tetraphenylsiloxane dianhydride plus 2,4-diaminotriphenylamine
(j) 3,4,3',4'-tetracarboxylic triphenylphosphine oxide deanhydride plus 2,4-diaminodiphenylamine
(k) 3,4,3',4'-tetracarboxylic triphenylphosphate dianhydried plus 2,4-diaminodiphenylsulfide

What is claimed is:

1. A polyimide consisting essentially of the recurring unit.

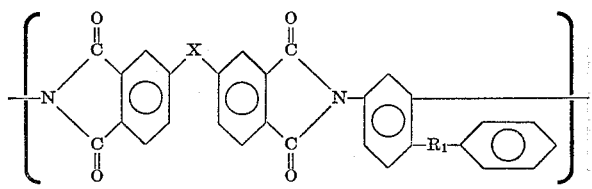

wherein $R_1$ is S, N—H, N-(lower)alkyl or N-aryl, and X is —O—, —S—, —CO—

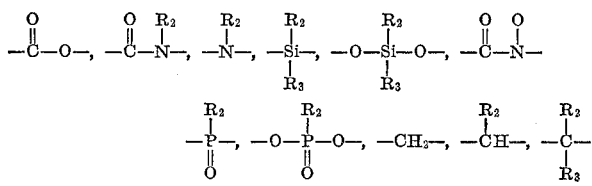

and phenylene, wherein $R_2$ and $R_3$ are (lower)alkyl of from 1 to 6 carbon atoms and aryl.

2. A polyimide according to claim 1, said polyimide consisting essentially of the recurring unit

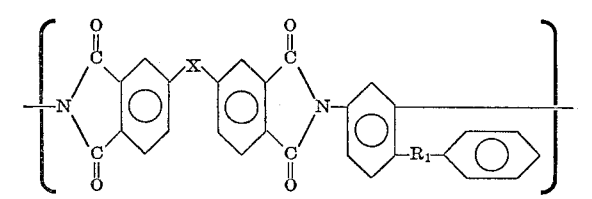

wherein $R_1$ is S, N—H, N-(lower)alkyl or N-aryl, and X is —O—, —SO$_2$—, —CO—

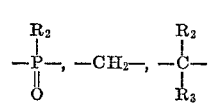

wherein $R_2$ and $R_3$ is lower alkyl of from 1 to 6 carbon atoms or aryl.

3. A polyimide according to claim 2, wherein $R_1$ is S.
4. A polyimide according to claim 2, wherein $R_1$ is NH, N-lower alkyl, or N-aryl.

5. A polyimide according to claim 1, said polyimide consisting essentially of the recurring unit

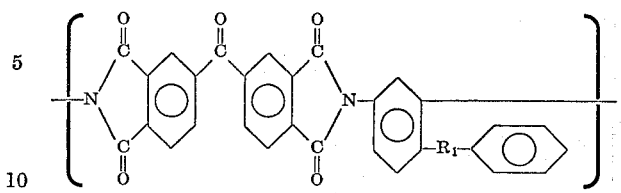

wherein $R_1$ is S, N—H, N-(lower)alkyl or N-aryl.

6. A polyimide according to claim 1, said polyimide consisting essentially of the recurring unit

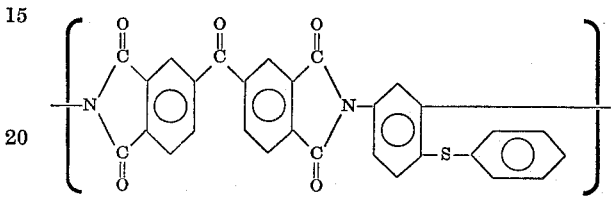

7. A polyimide according to claim 1, said polyimide consisting essentially of the recurring unit

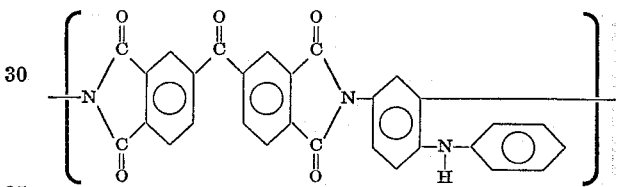

8. A polyimide according to claim 1, said polyimide consisting essentially of the recurring unit

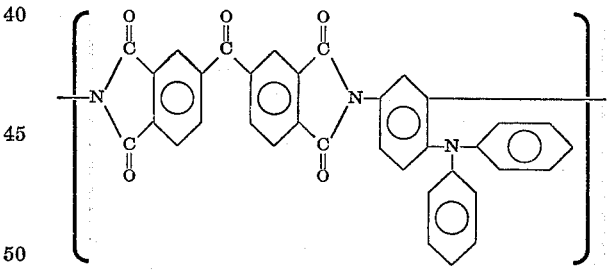

9. A polyamide acid consisting essentially of the recurring unit

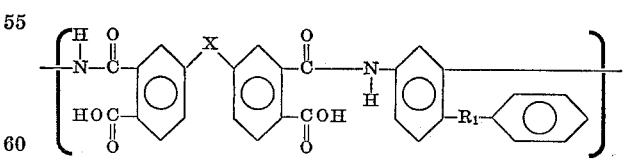

wherein $R_1$ is S, N—H, N-(lower)alkyl, N-aryl; and X is —O—, —S—, —CO—

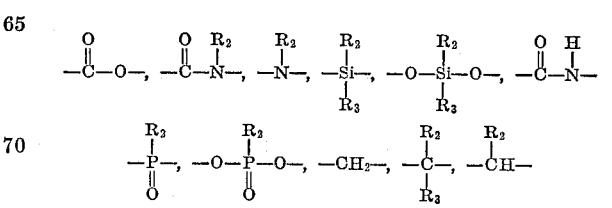

and phenylene wherein $R_2$ and $R_3$ (lower)alkyl of from 1 to 6 carbon atoms and aryl.

10. A polyamide acid according to claim 9, said polyamide acid consisting essentially of the recurring unit

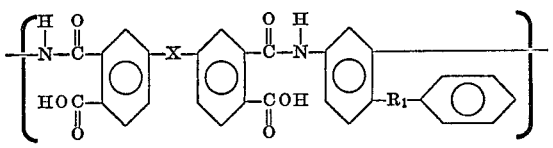

wherein $R_1$ is S, N—H, N-(lower)alkyl, N-aryl; and X is —O—, —SO$_2$—, —CO—

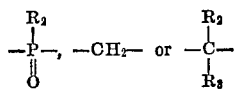

wherein $R_2$ and $R_3$ are lower alkyl of from 1 to 6 carbon atoms or aryl.

11. A polyamide acid according to claim 10 wherein $R_1$ is S.

12. A polyamide acid according to claim 10 wherein $R_1$ is N—H, N-(lower)alkyl, or N-aryl.

13. A polyamide acid according to claim 9, said polyamide acid consisting essentially of the recurring unit

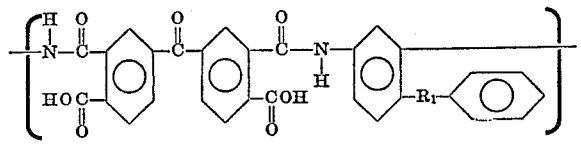

wherein $R_1$ is S, N—H, N-(lower)alkyl, or N-aryl.

14. A polyamide acid according to claim 13, said polyamide acid consisting essentially of the recurring unit

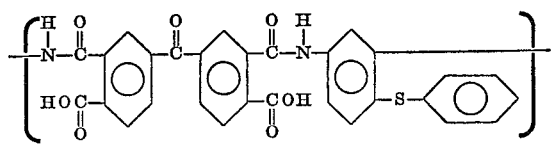

15. A polyamide acid according to claim 13, said polyamide acid consisting essentially of the recurring unit

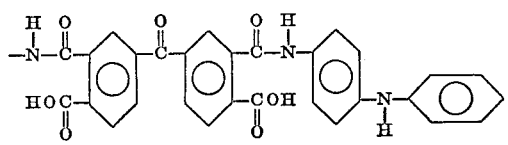

16. A polyamide acid according to claim 13, said polyamide acid consisting essentially of the recurring unit

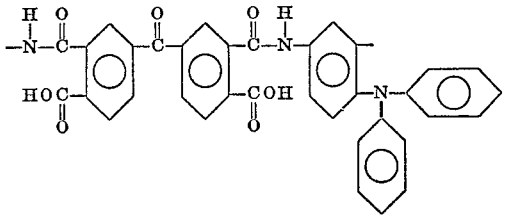

17. A solution of polyimide according to claim 1 in a volatile solvent for said polymer.

18. A solution of a polyimide according to claim 2 in a volatile solvent for said polymer.

19. A solution of a polyimide according to claim 5 in a volatile solvent for said polymer.

20. A solution of a polyimide according to claim 19 wherein said solvent is N-methyl pyrrolidone, dimethylacetamide, dimethylformamide, tetrahydrofuran and dioxane.

21. A solution of a polyamide acid according to claim 9 in a volatile solvent for said polymer.

22. A solution of a polyamide acid according to claim 10 in a volatile solvent for said polymer.

23. A solution of polyamide acid according to claim 13 in a volatile solvent for said polymer.

24. A solution of a polyamide acid according to claim 23, wherein said solvent is N-methyl pyrrolidone, dimethylacetamide, dimethylformamide, tetrahydrofuran and dioxane.

25. A self supporting film consisting essentially of at least one polyimide according to claim 1.

26. A metal article coated with at least one polyimide according to claim 1.

27. An article according to claim 1 in which the metal is copper.

28. A glass fabric or fiber impregnated with at least one polyimide according to claim 1.

29. A molding powder consisting essentially of at least one polyimide according to claim 1.

References Cited

UNITED STATES PATENTS

| | | | |
|---|---|---|---|
| 3,538,056 | 11/1970 | Caldwell | 260—78 |
| 3,539,537 | 11/1970 | Holub | 260—78 |
| 3,563,951 | 2/1971 | Raldman | 260—47 |
| 3,661,849 | 9/1972 | Culberton | 260—47 |

MORRIS LIEBMAN, Primary Examiner

R. H. ZAITLEN, Assistant Examiner

U.S. Cl. X.R.

260—30.4 N, 32.6 N, 47 CP, 78 TF, 576, 578